United States Patent [19]

Ko

[11] Patent Number: 5,430,495
[45] Date of Patent: Jul. 4, 1995

[54] VIDEO PLAYBACK APPARATUS CAPABLE OF VARYING CAPTION BRIGHTNESS BASED ON AUDIO LEVEL

[75] Inventor: Young-ok Ko, Kyungki, Rep. of Korea

[73] Assignee: Samsung Electronics Co., Ltd., Kyungki, Rep. of Korea

[21] Appl. No.: 1,627

[22] Filed: Jan. 7, 1993

[30] Foreign Application Priority Data

Jul. 15, 1992 [KR] Rep. of Korea ............ 92-12650

[51] Int. Cl.⁶ .................................. H04N 5/262
[52] U.S. Cl. ........................... 348/589; 348/587; 358/335
[58] Field of Search ............ 358/22, 183, 147, 335, 358/243, 168; H04N 5/57, 5/52, 9/74, 5/278, 5/272, 5/262, 5/275; 348/563, 564, 565, 578, 586, 587, 588, 589, 239

[56] References Cited

U.S. PATENT DOCUMENTS

| | | | |
|---|---|---|---|
| 3,778,542 | 12/1973 | Hansemann | 348/587 |
| 4,451,840 | 5/1984 | Shanley | 358/183 |
| 4,477,841 | 10/1984 | Chen | 358/335 |
| 4,549,217 | 10/1985 | Sendelweck | 358/243 |
| 4,549,218 | 10/1985 | Norley | 358/243 |
| 5,017,143 | 5/1991 | Backus | 358/183 |
| 5,264,933 | 11/1993 | Rosser et al. | 358/22 |

FOREIGN PATENT DOCUMENTS

| | | | |
|---|---|---|---|
| 0114681 | 7/1983 | Japan | 358/142 |
| 161589 | 9/1983 | Japan | 358/183 |
| 151883 | 8/1985 | Japan | 360/19.1 |
| 1273271 | 11/1989 | Japan | G11B 20/00 |
| 0260982 | 10/1990 | Japan | H04N 5/278 |
| 102982 | 4/1991 | Japan | H04N 5/262 |
| 113560 | 4/1992 | Japan | 360/19.1 |
| 4129062 | 4/1992 | Japan | 360/19.1 |

*Primary Examiner*—James J. Groody
*Assistant Examiner*—Chris Grant
*Attorney, Agent, or Firm*—Sughrue, Mion, Zinn, Macpeak & Seas

[57] ABSTRACT

Disclosed is a video playback apparatus which functions to vary the brightness of the caption color of a displayed caption according to audio level of the playback. The video playback apparatus displays caption signals on a predetermined area of a TV screen, and includes a level detector for detecting audio levels and a controller for controlling color brightness of the caption signals in response to and accordance with the audio levels detected. Thus, the captioned video signal (e.g. music lyrics) is displayed more vividly than heretofore.

5 Claims, 1 Drawing Sheet

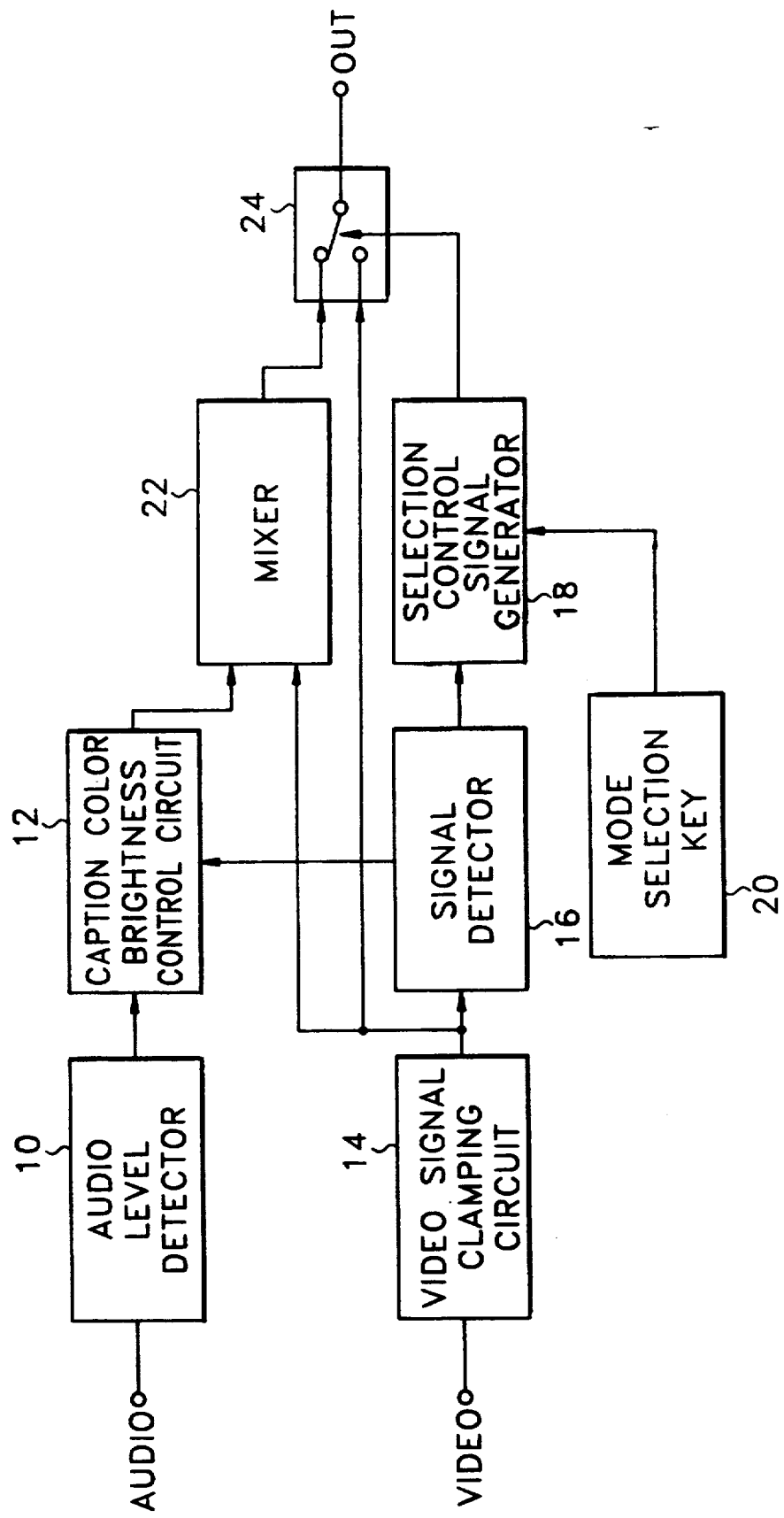

VIDEO PLAYBACK APPARATUS CAPABLE OF VARYING CAPTION BRIGHTNESS BASED ON AUDIO LEVEL

BACKGROUND OF THE INVENTION

The present invention relates to a video playback apparatus, and more particularly to a video playback apparatus which functions to vary the brightness of caption colors of a caption displayed on a TV screen.

A character screen display or a caption function is sometimes added on to a magnetic tape or an optical disc playback apparatus, to thereby be utilized in audio-visual education or linguistic education. Also, a video electronic orchestral accompaniment apparatus such as a "videoke" or "karaoke" provides a music accompaniment while processing the lyric lines of songs and displaying them on a screen. However, the aforesaid conventional apparatuses simply display the lyric lines as a single color superposed on the video background. Accordingly, the displayed lyric lines have no vividness. Particularly, in this case, an auditorily handicapped person may be able to understand the contents of the background screen as well as the lyrics, but nonetheless has difficulty discerning the strength and weakness of the audio portion of the playback.

U.S. Pat. No. 4,568,981 discloses one conventional video caption generating apparatus, with which the user can select desired colors or color tones to realize a high-definition caption. A further patent, U.S. Pat. No. 4,794,383, discloses technology for varying the colors of both the character and the background according to an external measuring value, thereby providing an apparatus capable of rapidly recognizing the significance of the measuring value. However, neither the above U.S. patents nor their combination can provide an apparatus capable of varying caption color brightness or color tones in accordance with playback audio levels, as in the present invention described hereinafter.

SUMMARY OF THE INVENTION

Therefore, to solve the above problems, it is an object of the present invention to provide a video playback apparatus which functions to vary the brightness of caption colors so as to display a more vivid caption according to audio levels.

To accomplish the above object of the present invention, there is provided a video playback apparatus for displaying caption signals on a predetermined area of a TV screen, comprising level detector means for detecting audio levels, and means for controlling color brightness of the caption signals in response to the detected audio levels.

BRIEF DESCRIPTION OF THE DRAWINGS

The above object and other advantages of the present invention will become more apparent by describing in detail a preferred embodiment of the present invention with reference to the attached drawings in which:

FIG. 1 is a block diagram of portions of a video playback apparatus having the function of varying caption color brightness according to the present invention.

DETAILED DESCRIPTION OF THE INVENTION

Constitution and operation of the present invention will be described below with reference to the accompanying drawing FIG. 1.

In FIG. 1, an audio level detector 10 receives an audio signal and performs integration and low-pass filtering, to generate a voltage signal corresponding to the audio level of an audio signal. The audio level can then be divided into fractionalized level classes at the designer's option. For example, one audio level range can be subdivided into four steps: high, medium, low or very low levels. Also, using an analog-to-digital converter, digital data corresponding to the subdivided audio levels may be generated.

A caption color brightness control circuit 12 generates caption signals of varying color brightness in response to the voltage signal representing the subdivided audio levels.

A video signal clamping circuit 14 receives a video signal and adjusts the video level. The level-adjusted video output from the clamping circuit 14 is supplied to a mixer 22, so as to be synchronously mixed with the caption signal, the color brightness of which is controlled according to audio level.

A signal detector 16 detects a caption signal and a caption window signal from the clamped video signal. The detected caption signal is supplied to the caption color brightness control circuit 12 and the caption window signal is separately supplied to a selection control signal generator 18.

When a caption color brightness varying function is selected with a mode selection key 20, the selection control signal generator 18 generates the caption window signal as a selection control signal.

The mixer 22 mixes the clamped video signal and the color-brightness-controlled caption signal and generates a mixed signal.

An output selector 24 selects between the signal output from mixer 22 and the clamped video signal in response to the selection control signal originating from the selection control signal generator 18.

As described above, in the present invention, when the user presses a function key 20, the caption color brightness varying mode is selected. Accordingly, the mode selection signal goes high, thereby providing the output selector 24 with the caption window signal from the signal detector 16 in the form of a selection control signal. The output selector 24 selects the output signal from the mixer 22 whenever the caption window signal is supplied thereto. Otherwise, it selects the output signal of the video signal clamping circuit 14.

Therefore, according to the invention, the caption signal level is controlled according to the audio level changes, so that the caption color brightness controlled signal is mixed with the video signal, thereby generating a mixed signal. Thus, the user can recognize the caption color brightness varied in response to the audio level changes. Accordingly, the user can experience the audio atmosphere by means of the changes of the color brightness, thereby enjoying more vivid video and music.

What is claimed is:

1. A video playback apparatus for displaying caption signals on a predetermined area of a TV screen, comprising:

level detector means for detecting an audio level of an audio signal, and means for controlling color brightness of the caption signals in response to the detected audio level, wherein said means for controlling color brightness of the caption signals comprises a function key, so as to select a video signal mixed with the color brightness controlled caption signal in response to the audio level when said function key is actuated.

2. A video apparatus for displaying a caption signal on a predetermined area of a TV screen, comprising:

a level detector that detects an audio level of an audio signal;

a color brightness controller that responds to said level detector to control the color brightness of a caption signal in accordance with the detected audio level;

a video signal clamping circuit for producing a clamped video signal; and a signal detector for detecting the caption signal and a caption window signal from the clamped video signal; and wherein said color brightness controller comprises:

a caption color brightness control circuit for generating a caption signal of varying color brightness;

a mixer that receives and mixes the clamped video signal and the caption signal of varying color brightness to output a mixed signal comprising a video signal and a caption varying in color brightness;

selection control means for producing a selection control signal; and a switching means responsive to said selection control means for outputting either the mixed signal or the clamped video signal.

3. A video apparatus according to claim 2, wherein said level detector integrates and low-pass filters the audio signal to generate a voltage signal indicative of the audio level of the audio signal.

4. A video apparatus according to claim 2, wherein said level detector fractionalizes the audio signal into a plurality of level steps to generate a voltage signal indicative of the audio level of the audio signal.

5. A video apparatus according to claim 2, wherein said selection control means comprises:

a mode selection key that produces a mode selection signal in response to actuation; and a selection control signal generator that receives the caption window signal from said signal detector and the mode selection signal from said mode selection key, and that produces the selection control signal in response to the mode selection signal.

* * * * *